United States Patent
Bae et al.

(10) Patent No.: US 7,996,412 B2
(45) Date of Patent: Aug. 9, 2011

(54) SCHEDULE INFORMATION MANAGEMENT METHOD AND SYSTEM USING DIGITAL LIVING NETWORK ALLIANCE NETWORK

(75) Inventors: Young Kyu Bae, Suwon-si (KR); Ho Chul Shin, Suwon-si (KR); Chul Seung Kim, Seoul (KR); Yun Je Oh, Yongin-si (KR); Joon Oo Kim, Suwon-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 340 days.

(21) Appl. No.: 11/695,660

(22) Filed: Apr. 3, 2007

(65) Prior Publication Data
US 2007/0266008 A1 Nov. 15, 2007

(30) Foreign Application Priority Data
May 9, 2006 (KR) .................. 10-2006-0041327

(51) Int. Cl.
*G06F 7/00* (2006.01)
*G06F 17/00* (2006.01)

(52) U.S. Cl. ...................... 707/754; 455/413

(58) Field of Classification Search ............... 707/101; 379/88.13
See application file for complete search history.

(56) References Cited

U.S. PATENT DOCUMENTS

| | | | | |
|---|---|---|---|---|
| 5,754,629 A | * | 5/1998 | Kunimori et al. | 379/88.13 |
| 5,956,681 A | * | 9/1999 | Yamakita | 704/260 |
| 6,101,471 A | * | 8/2000 | Shintaku et al. | 704/270 |
| 6,141,662 A | * | 10/2000 | Jeyachandran | 707/2 |
| 6,401,085 B1 | * | 6/2002 | Gershman et al. | 707/4 |
| 6,775,358 B1 | * | 8/2004 | Breitenbach et al. | 379/88.13 |
| 6,823,341 B1 | * | 11/2004 | Dietz | 707/100 |
| 6,829,622 B2 | * | 12/2004 | Beyda | 707/203 |
| 2003/0125950 A1 | * | 7/2003 | Avila et al. | 704/260 |
| 2004/0267917 A1 | * | 12/2004 | Tokkonen et al. | 709/223 |
| 2005/0262171 A1 | * | 11/2005 | Chang | 707/999.204 |

FOREIGN PATENT DOCUMENTS

| | | | | |
|---|---|---|---|---|
| JP | 57111656 A | * | 7/1982 | |
| JP | 11031180 A | * | 2/1999 | |
| JP | 2003259450 A | * | 9/2003 | |
| KR | 1998-78071 | | 7/1999 | |
| KR | 2002-42912 | | 6/2002 | |

* cited by examiner

*Primary Examiner* — Sathyanarayan Pannala
(74) *Attorney, Agent, or Firm* — Cha & Reiter, LLC

(57) ABSTRACT

A method and system for managing schedule information using a digital living network alliance (DLNA) network are disclosed. The method includes receiving a schedule memo stored in a portable terminal via a DLNA network, analyzing the schedule memo and creating a query for searching for supplementary information related to the schedule memo, transmitting the created query to a Web server, receiving, in reply to the query, a Web search result from the Web server, generating detailed schedule information using the Web search result and transmitting the detailed schedule information to the portable terminal via the DLNA network.

16 Claims, 5 Drawing Sheets

FIG. 4A

| QUERY INFORMATION TABLE | (10) |
|---|---|
| ATTRIBUTE FIELD | (11) |
| SEARCH WORD FIELD | (13) |

FIG. 4B

| ATTRIBUTE | SEARCH WORD |
|---|---|
| PLACE | EVENT |
| | TRANSPORTATION |
| | ATTRACTIONS |
| ⋮ | ⋮ |

SCHEDULE INFORMATION MANAGEMENT METHOD AND SYSTEM USING DIGITAL LIVING NETWORK ALLIANCE NETWORK

CLAIM OF PRIORITY

This application claims the benefit of the earlier filing date, pursuant to 35 USC 119(e), to that patent application entitled "Schedule Information Management Method And System Using Digital Living Network Alliance Network," filed in the Korean Intellectual Property Office on May 9, 2006 and assigned Serial No. 2006-0041327, the contents of which are incorporated herein by reference.

BACKGROUND OF THE INVENTION

1. Field of the Invention

The present invention relates to a schedule information management method and system and, more particularly, to a schedule information management method and system wherein detailed schedule information is created and managed using a schedule memo input through a portable terminal.

2. Description of the Related Art

Advances in communication technologies have enabled popularization of portable terminals. In addition to conventional phone call processing, advanced portable terminals support various functions such as text message and image transmission. Thereby, users are increasing utilizing portable terminals in their daily lives.

In one aspect, to manage schedules, a user stores a list of events and planned times in their portable terminal and sets the portable terminal to inform him/her of each event at or before the corresponding planned time.

However, such schedule management using a portable terminal is restrictive as, typically, schedule information input and managed in a portable terminal is in the form of simple memos. Thus, more plentiful information regarding planned events cannot be provided to the user.

In recent years, a home network system that interconnects and manages home electronics devices through a network has been commercially available. As part of an effort to standardize home network systems, the Digital Living Network Alliance (DLNA) has been formed to develop standards for controlling home information appliances such as personal computers (PC), televisions, video tape recorders, digital cameras, audio systems, etc. The DLNA, formerly known as the Digital Home Working Group (DHWG), is a standardization body established in June 2003. Several large firms including Microsoft, IBM, Hewlett-Packard, Intel, Sony, Matsushita and Samsung have joined the DLNA.

The DLNA is dedicated to the sharing of all content provided by different information appliances in the home. Therefore, the DLNA mainly focuses on insuring compatibility between home electronics devices through standardization of physical media, network transmission, media formats, streaming protocols, digital rights management and the like on the basis of a 'universal plug and play' technology. The DLNA also focuses on developing networks based on the Internet Protocol (IP).

As a result, when a PC is connected to both an Internet network and a DLNA network in the home, the PC can communicate both with external devices connected to the Internet network using an Internet-assigned IP address and with in-home devices connected to the DLNA network using a DLNA network-assigned IP address. Thus, the PC may share information obtained from the Internet network with the in-home devices connected to the DLNA network.

Accordingly, schedule management using a DLNA network enables limitations of using information stored only in a portable terminal to be overcome.

SUMMARY OF THE INVENTION

The present invention has been made in view of the above problems, and an object of the present invention is to provide a schedule information management method and system using a digital living network alliance (DLNA) network that can overcome conventional limitations of schedule management using information stored only in a portable terminal.

Another object of the present invention is to provide a schedule information management method and system that provide detailed schedule information containing supplementary information in addition to a schedule memo stored in a portable terminal.

In accordance with an exemplary embodiment of the present invention, there is provided a schedule information management method comprising receiving a schedule memo stored in a portable terminal via a digital living network alliance (DLNA) network, analyzing the schedule memo to create a query for searching supplementary information related to the schedule memo, transmitting the created query to a Web server, receiving, in reply to the query, a Web search result from the Web server, generating detailed schedule information using the Web search result and transmitting the detailed schedule information to the portable terminal via the DLNA network.

Preferably, the analyzing step includes separating the schedule memo into words and extracting effective nouns from the separated words and creating the query in such a manner that the query contains a pre-stored search site address and at least one of the effective nouns.

The schedule information management method may further include generating a query information table for storing nouns that frequently occur in schedule memos and are classified according to their attributes, and for storing a search word to be inserted into a query for each attribute. Preferably, in the creating the query step an attribute of an effective noun is found from the query information table and a search word associated with the found attribute is selected and inserted into the created query.

Preferably, in the receiving a Web search result step the Web search result is in the form of a Web page. Preferably, in the generating step, tags are removed from the received Web page to extract text and image data and the detailed schedule information containing the extracted text and image data is generated in a form displayable by the portable terminal.

The schedule information management method may further include outputting, by the portable terminal after reception of the detailed schedule information, the detailed schedule information.

The outputting step further includes checking a planned event time associated with the detailed schedule information and outputting the detailed schedule information at the commencement of a preset time before the planned event time.

In accordance with another exemplary embodiment of the present invention, there is provided a schedule information management system including a schedule information management apparatus connected to a digital living network alliance (DLNA) network, for schedule information management, and a portable terminal for composing a schedule memo according to a user request and outputting detailed schedule information generated using the schedule memo to the user.

In accordance with another exemplary embodiment of the present invention, there is provided a schedule information management apparatus including a DLNA interface for storing DLNA protocols and for sending and receiving data through the DLNA network, a schedule memo analyzer for analyzing a schedule memo received from an external device through the DLNA interface, a query generator for generating a query to search supplementary information related to the analyzed schedule memo, a Web interface for transmitting the generated query to a Web server and receiving, in reply to the query, a Web search result from the Web server, a schedule information generator for generating detailed schedule information related to the schedule memo using the Web search result, and a controller for controlling the DLNA interface to transmit the detailed schedule information to the external device.

Preferably, the schedule memo analyzer separates the schedule memo into words and transmits effective nouns selected from the separated words to the query generator.

Preferably, the query generator pre-stores a search site address and generates the query in such a manner that the query contains the pre-stored search site address and at least one of the effective nouns.

The schedule information management apparatus may further include a query information memory for storing nouns that frequently occur in schedule memos and are classified according to their attributes, and for storing a search word to be inserted into a query for each attribute. Preferably, the query generator finds an attribute of an effective noun, if available, from the query information memory and inserts a selected search word associated with the found attribute into the generated query.

Preferably, the Web interface receives a Web page as the Web search result.

Preferably, the schedule information generator removes tags from the received Web page to extract text and image data, and generates the detailed schedule information containing the extracted text and image data in a form displayable by the external device.

BRIEF DESCRIPTION OF THE DRAWINGS

The above features and advantages of the present invention will be more apparent from the following detailed description in conjunction with the accompanying drawings, in which:

FIGS. 4A and 4B illustrate structures of data records storing information used to create a query for searching for supplementary information in the apparatus of FIG. 3.

DETAILED DESCRIPTION OF THE INVENTION

Figure 1:
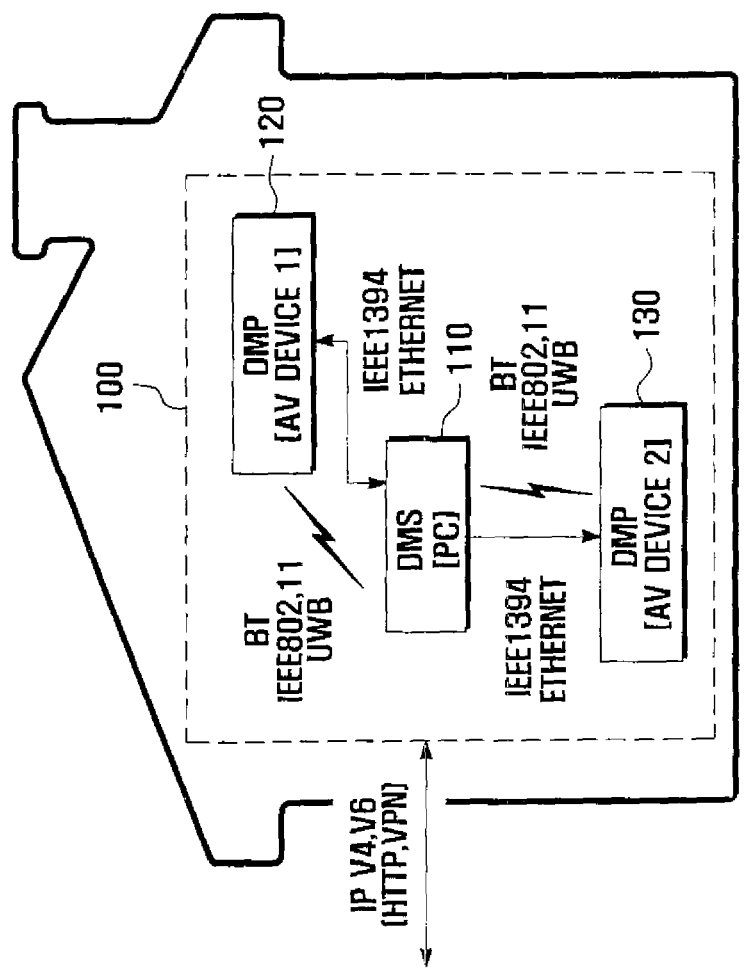
FIG. 1 illustrates a configuration of a DLNA network system according to the present invention.
Figure 1:
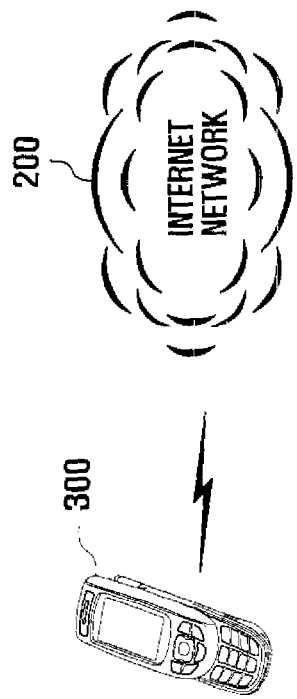

Hereinafter, embodiments of the present invention are described in detail with reference to the accompanying drawings. The same reference symbols identify the same or corresponding elements in the drawings. Some constructions or processes known in the art may be not described to avoid obscuring the invention in unnecessary detail.

FIG. 1 illustrates a configuration of a DLNA network system according to the present invention. Referring to FIG. 1, the DLNA network system includes an in-home DLNA system 100 for forming a DLNA network in the home, and a portable terminal 300 connected to the in-home DLNA system 100 through an Internet network 200.

The in-home DLNA system 100 includes a digital media server (DMS) 110, such as a personal computer (PC), for providing multimedia content, and a plurality of digital media players (DMP) 120 and 130 such as audio/video (AV) devices for processing multimedia content provided by the DMS 110. The DMS 110 may communicate with the DMPs 120 and 130 through a wired network using, for example, an IEEE 1394 or Ethernet technology, or through a wireless network using, for example, Bluetooth, IEEE 802.11 or Ultra Wide Band (UWB) technology. The DMS 110 may also act as a gateway on a home network. The DMPs 120 and 130 may each also act as a control point (CP).

The in-home DLNA system 100 is connected to the Internet network 200 through IPv4 or IPv6 protocols or through a virtual private network (VPN). The portable terminal 300 connects to the in-home DLNA system 100 via the Internet network 200.

The in-home DLNA system 100 enables sharing of information such as digital content between various devices connected to the DLNA network. For example, the DMP 120 or 130 can freely access and play AV content stored in the DMS 110. Other devices connected to the DLNA network can share information obtained by the DMS 110 through the Internet network 200.

In the present invention, the DMS 110, which is connected to the portable terminal 300 via the DLNA network, searches the Internet network 200 using a schedule memo stored in the portable terminal 300 and supplies searched information to the portable terminal 300. As a result, if the user inputs a simple schedule memo to the portable terminal 300, a user can obtain information related to the schedule memo from the Internet network 200.

Figure 2:
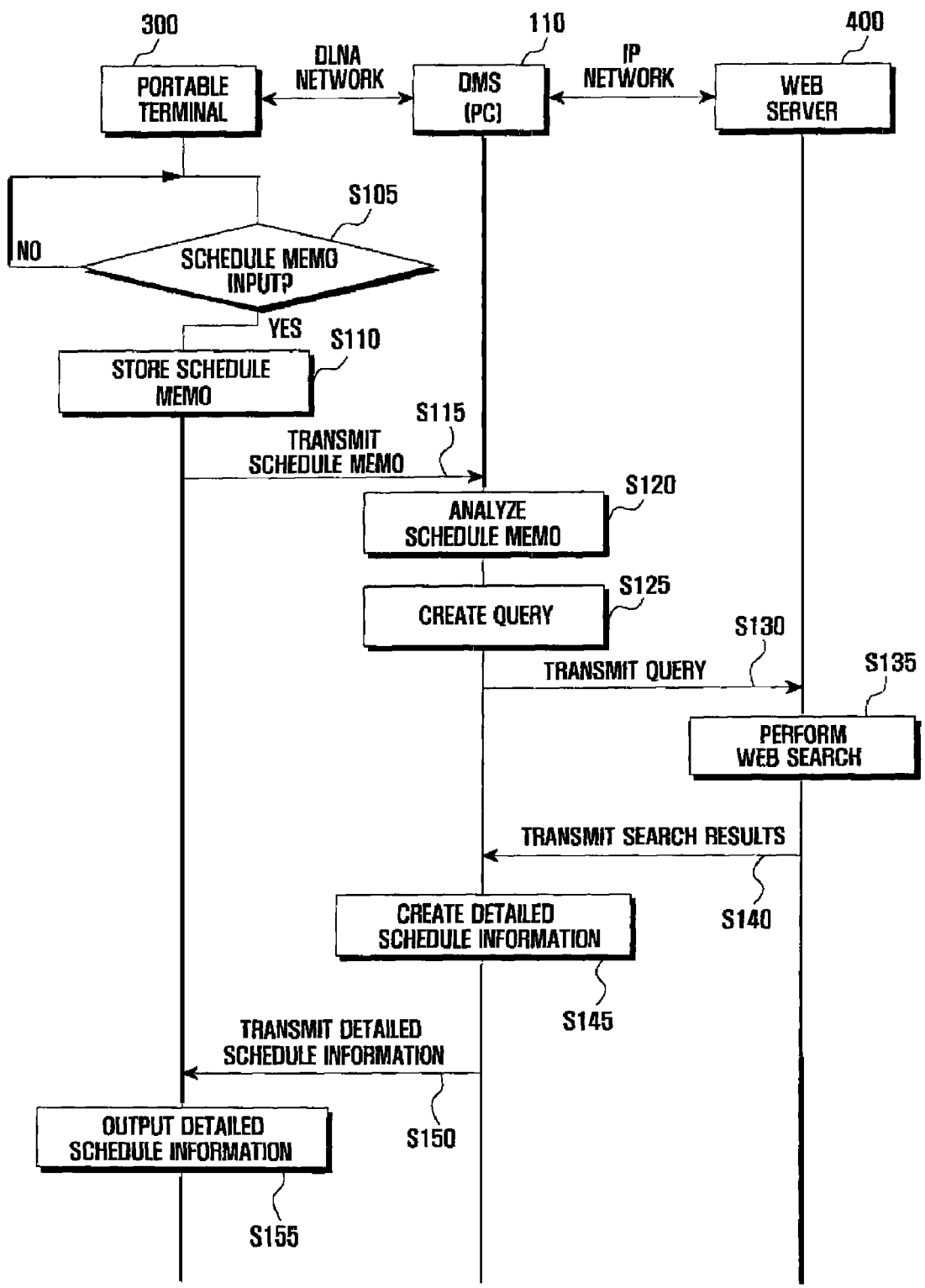
FIG. 2 illustrates steps of a schedule information management method using a DLNA network according to an exemplary embodiment of the present invention.

FIG. 2 illustrates steps of a schedule information management method using a DLNA network according to an exemplary embodiment of the present invention. In FIG. 2, a DMS 110, such as a PC, is connected both to a portable terminal 300 via a DLNA network and to a Web server 400 via an IP network. The DMS 110 creates detailed schedule information using information contained as a schedule memo stored in the portable terminal 300, and supplies the detailed schedule information to the portable terminal 300.

Referring to FIG. 2, the method is described as follows. When a schedule memo is input (S105), the portable terminal 300 stores the schedule memo (S110) then transmits the schedule memo to the DMS 110 through the DLNA network (S115).

The DMS 110 receives the information of the schedule memo from the portable terminal 300 through the DLNA network, analyzes the schedule memo information (S120), and creates a query for searching supplementary information related to the schedule memo (S125). Preferably, the DMS 110 separates the schedule memo into words, extracts 'effective nouns' that are considered useful as search terms in query generation from the separated words, and creates a query including a pre-stored search site address (for example, the url address to access the worldwide website "naver.com" or "_yahoo.com") and at least one of the effective nouns.

For example, at step S120, in the case of a schedule memo "or May 5, visit aa_harbor, friend xy" and a pre-stored search site for the worldwide website address 'naver.com', the DMS 110 separates the schedule memo into words 'May 5', 'visit', 'aa_harbor', 'friend' and the like, and extracts effective nouns 'May 5' and 'aa_harbor' from the words. At step S125, the DMS 110 creates a query including the effective nouns and the search site address, such as the URL for the worldwide website: naver.com/?keyword="May 5 aa_harbor".

In addition, preferably, the DMS 110 classifies nouns frequently occurring in schedule memos according to their attributes, stores the classified nouns along with their attributes in a query information table, and registers search words that may be inserted into queries for each attribute. Thereafter, the DMS 110 creates a query so that a search word selected from the query information table is inserted into the query as an additional search term. That is, when the DMS 110 creates a query, the attribute of an extracted effective noun is found from the query information table and a search word associated with the found attribute is selected and inserted into the query as an additional search term.

For example, if nouns having an attribute 'place' (e.g, 'aa_harbor', 'bb_island' or 'cc_mountain') frequently occur in schedule memos, the DMS 110 stores the nouns 'aa_harbor', 'bb_island' and 'cc_mountain' along with the attribute 'place' in the query information table, and registers search words 'event', 'transportation' and 'attractions' in relation to the attribute 'place'. When a query including an effective noun 'aa_harbor' is created, the query preferably further includes registered search words 'event', 'transportation' and 'attractions' associated with the attribute 'place', which is the attribute of the effective noun 'aa_harbor'such as naver.com/?keyword="May 5 as_harbor event transportation attractions".

After query creation, the DMS 110 transmits the created query to the Web server 400 (S130).

The Web server 400 performs a Web search using the received query (S135), and transmits the search result to the DMS 110 (S140). That is, the Web server 400 connects to the search site (e.g., the official website for "naver.com"), performs a Web search using words contained in the query (for example, 'May 5', 'aa_harbor''event', 'transportation' and 'attractions') as keywords, and transmits the search result (preferably, a Web page) to the DMS 110.

After reception of a Web page as the search result, the DMS 110 creates detailed schedule information using the received Web page (S145), and transmits the detailed schedule information to the portable terminal 300 (S150). Preferably, the DMS 110 extracts text and image data by removing tags from the received Web page, and creates detailed schedule information containing the extracted text and image data in, for example, the Extensible Markup Language (XML), so that the information can be displayed by the portable terminal 300.

As a result, for example, the detailed schedule information transmitted to the portable terminal 300 at step S150 contains information regarding an event planned on May 5 at 'aa_harbor', means of transportation thereto, and nearby tourist attractions.

After reception of the detailed schedule information, the portable terminal 300 outputs the detailed schedule information (S155). Preferably, the portable terminal 300 checks a planned event time associated with the detailed schedule information and presents the detailed schedule information at the commencement of a preset time before the planned event time for more effective utilization of the schedule information. For example, if a planned event time is May 5, corresponding detailed schedule information is output, for example, at 9 A.M. on May 4, 24 hours before the planned event time. Or as would be recognized, the user may set the time before the planned event at which the data may be output or presented.

Figure 3:
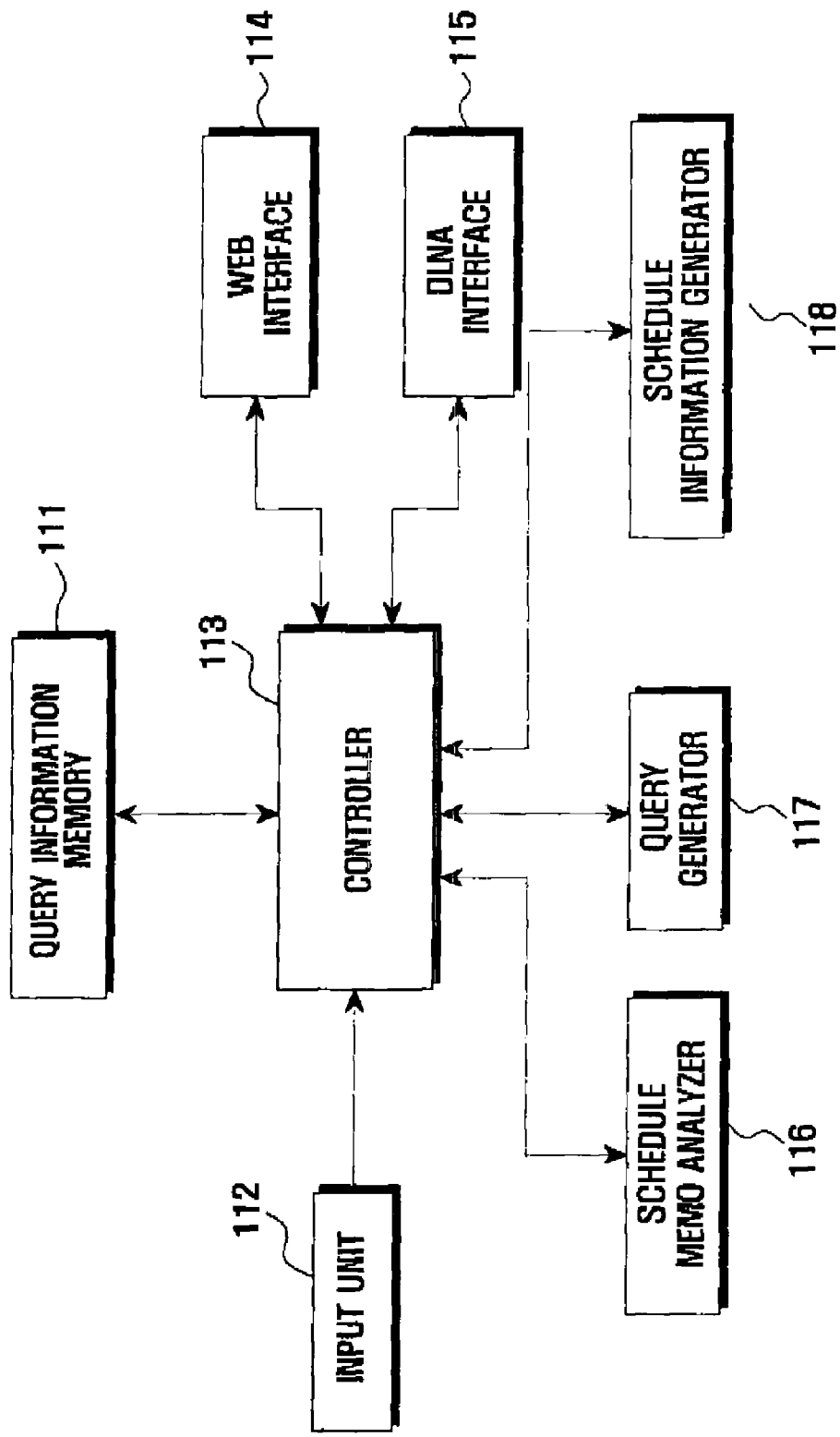
FIG. 3 illustrates a configuration of a schedule information management apparatus using a DLNA network according to another exemplary embodiment of the present invention.

FIG. 3 illustrates a configuration of a schedule information management apparatus using a DLNA network according to another exemplary embodiment of the present invention. The apparatus of FIG. 3 creates detailed schedule information using a schedule memo input through an external device such as a portable terminal, and supplies the detailed schedule information to the external device. In general, the apparatus is preferably implemented on a PC connected to a DLNA network. The apparatus of FIG. 3 corresponds to the DMS 110 in FIG. 1.

Referring to FIG. 3, the DMS 110 for managing schedule information includes a query information memory 111, an input unit 112, a controller 113, a Web interface 114, a DLNA interface 115, a schedule memo analyzer 116, a query generator 117, and a schedule information generator 118.

The query information memory 111 stores reference information for query generation by the query generator 117. Preferably, the query information memory 111 stores nouns that frequently occur in schedule memos and are classified according to their attributes, and also stores a search word that may be inserted into a query for each attribute.

For example, if nouns having an attribute 'place' such as 'aa_harbor', 'bb_island' and 'cc_mountain' frequently occur in schedule memos, the query information memory 111 stores the nouns 'aa_harbor', 'bb_island' and 'cc_mountain' along with the attribute 'place', and registers search words 'event', 'transportation' and 'attractions' in relation to the attribute 'place'.

Thereto, preferably, the query information memory 111 stores a query information table, whose record structure is illustrated in FIGS. 4A and 4B and described later.

The input unit 112 inputs a manipulation signal from a user and sends the manipulation signal to the controller 113 for control of the DMS 110.

The controller 113 controls operation of the DMS 110 on the basis of manipulation signals input through the input unit 112 and processing algorithms set in advance. For example, the controller 113 controls other elements so that, in response to input of a schedule memo from an external device such as a portable terminal, detailed schedule information is created and supplied to the external device. Preferably, the controller 113 controls the DLNA interface 115 to transmit detailed schedule information created by the schedule information generator 118 to the external device via a DLNA network.

The Web interface 114 enables the DMS 110 to connect to an Internet network for exchange of data with devices connected to the Internet network. Preferably, the Web interface 114 transmits a query created by the query generator 117 to a Web server, and receives in return the Web search result as a Web page from the Web server.

The DLNA interface 115 stores DLNA protocols, and sends and receives data through a DLNA network under the control of the controller 113.

The schedule memo analyzer 116 analyzes a schedule memo that is received from an external device such as a portable terminal through the DLNA interface 115, and sends the analysis result to the query generator 117. Preferably, the schedule memo analyzer 116 separates the schedule memo into words, extracts effective nouns from the separated words, and sends the extracted effective nouns to the query generator 117. For example, in the case of a schedule memo "on May 5, visit aa harbor, friend xy", the schedule memo analyzer 116 separates the schedule memo into words 'May 5', 'visit', 'aa_harbor', 'friend', etc., extracts effective nouns 'May 5' and 'aa_harbor' from the words, and sends the effective nouns 'May 5' and 'aa_harbor' to the query generator 117.

The query generator 117 generates a query for searching supplementary information related to the analysis result. Preferably, the query generator 117 pre-stores a search site address (for example, 'www.naver.com', 'www.yahoo.com', etc.), and creates a query including the search site address and at least one effective noun. For example, in the case of a pre-stored search site address 'www.naver.com' and effective nouns 'May 5' and 'aa_harbor' received from the schedule memo analyzer 116, the query generator 117 creates a query such as the URL address for "naver.com/?keyword="May 5 aa_harbor".

Further, preferably, for generation of a query, the query generator 117 finds the attribute of an extracted effective noun, if available, from the query information memory 111, selects a search word associated with the found attribute, and inserts the selected search word into the query as an additional search term.

For example, assume that nouns 'aa_harbor', 'bb_island' and 'cc_mountain' are stored along with an attribute 'place' in the query information memory 111, and search words 'event', 'transportation' and 'attractions' are registered in relation to the attribute 'place'. When the query generator 117 generates a query including an effective noun 'aa_harbor', the query generator 117 preferably inserts registered search words 'event', 'transportation' and 'attractions' associated with the attribute 'place' into the query, such as the URL, address for the wordwide website "naver.com/?keyword="May 5 aa_harbor event transportation attractions".

The schedule information generator 118 generates detailed schedule information corresponding to the schedule memo using a Web page as the search result received through the Web interface 114. Preferably, the schedule information generator 118 extracts text and image data by removing tags from the received Web page, and generates detailed schedule information containing the extracted text and image data in such a manner that the generated information can be displayed by the external device.

FIGS. 4A and 4B illustrate structures of data records, e.g., tables, storing information used to create a query for searching supplementary information in the apparatus of FIG. 3. The data records of FIGS. 4A and 4B are stored in the query information memory 111. FIG. 4A illustrates the structure of a record, and FIG. 4B illustrates a record stored in the query information table.

Referring to FIG. 4A, a record of the query information table 10 includes an attribute field 11 and a search word field 13. The attribute field 11 stores an attribute such as 'place' for categorizing nouns considered to be frequently occurring in schedule memos. The search word field 13 stores at least one word that may be utilized as an additional search term when a noun having the attribute stored in the attribute field 11 is present in a query for search.

FIG. 4B illustrates a record whose attribute field 11 stores an attribute 'place' and search word field 13 stores words 'event', 'transportation' and 'attractions'.

As described above, the query information memory 111 stores and manages words that can be used as additional search terms in creation of queries according to their attributes, thereby enabling derivation of more useful search results for the user.

Figure 5:
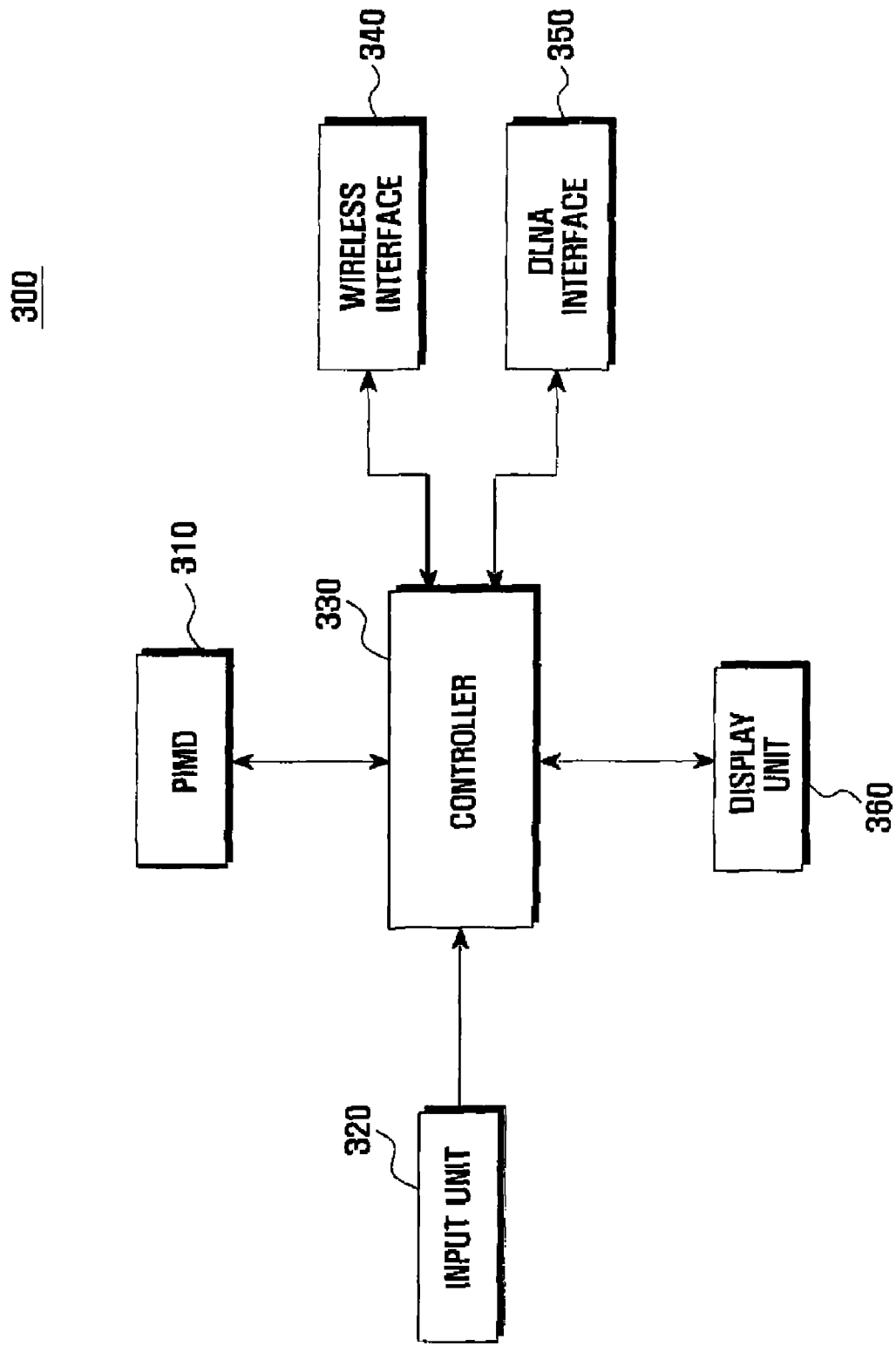
FIG. 5 illustrates a configuration of a portable terminal receiving detailed schedule information through a DLNA network according to another exemplary embodiment of the present invention.

FIG. 5 illustrates a configuration of a portable terminal receiving detailed schedule information through a DLNA network according to another exemplary embodiment of the present invention. FIG. 5 illustrates a device that stores a schedule memo input by the user, receives detailed schedule information related to the schedule memo via a DLNA network, and delivers the detailed schedule information to the user. The device is preferably implemented by a portable terminal on a DLNA network. The device of FIG. 5 corresponds to the portable terminal 300 in FIG. 1.

Referring to FIG. 5, the portable terminal 300 includes a personal information management module (PIMD) 310, an input unit 320, a controller 330, a wireless interface 340, a DLNA interface 350, and a display unit 360.

The PIMD 310 is a module for efficiently managing various personal information generated in a user's daily life. The PIMD 310 stores a schedule memo input through the input unit 320.

The input unit 320 inputs a manipulation signal and sends the manipulation signal to the controller 330, for control of the portable terminal 300.

The controller 330 controls operation of the portable terminal 300 on the basis of manipulation signals input through the input unit 320 and processing algorithms set in advance. Preferably, the controller 330 controls the DLNA interface 350 to transmit a schedule memo via a DLNA network and to receive in return detailed schedule information via the DLNA network.

The controller 330 also controls the display unit 360 to output detailed schedule information received through the DLNA interface 350. Preferably, the controller 330 checks a planned event time associated with the detailed schedule information, and controls output of the detailed schedule information at the commencement of a preset time or a preset time period before the planned event time.

The wireless interface 340 performs wireless communication, an intrinsic function of the portable terminal 300. For example, the wireless interface 340 sends and receives data via a mobile communication network.

The DLNA interface 350 stores DLNA protocols, and sends a schedule memo through a DLNA network and receives in return detailed schedule information through the DLNA network, under the control of the controller 330.

The display unit 360 displays detailed schedule information under the control of the controller 330.

As apparent from the above description, the present invention provides a schedule information management method and system using a digital living network alliance (DLNA) network that can overcome conventional limitations of schedule management using information stored only in a portable terminal. In addition to a schedule memo stored in the portable terminal, supplementary information related thereto can be delivered to the user. By inputting a simple schedule memo, the user can easily obtain effective supplementary information.

While preferred embodiments of the present invention have been shown and described in this specification, it will be understood by those skilled in the art that various changes or modifications of the embodiments are possible without departing from the spirit and scope of the invention as defined by the appended claims. For example, although query generation using an attribute 'place' is described in the description, query generation in the present invention is not limited to the use of the attribute 'place'.

What is claimed is:

1. A schedule information management method comprising:
receiving by a digital media server (DMS) a schedule memo stored in a portable terminal and transmitted to the DMS via a digital living network alliance (DLNA) network;
the DMS analyzing the schedule memo and automatically creating a query for searching for supplementary information related to the schedule memo based on information in the schedule memo;
the DMS transmitting the created query to a Web server via an IP network;
the DMS receiving, in reply to the query, a Web search result from the Web server including supplementary information related to the schedule memo;
said DMS generating detailed schedule information using the supplementary information from the Web search result; and
the DMS transmitting the detailed schedule information to the portable terminal via the DLNA network to supplement the information in the schedule memo with supplementary information in addition to the information in the schedule memo received by the DMS.

2. The schedule information management method of claim 1, wherein the step of analyzing the schedule comprises:
separating by the DMS the schedule memo into words and extracting effective nouns from the separated words; and
automatically creating by the DMS the query comprising at least one pre-stored search site address and at least one of the effective nouns.

3. The schedule information management method of claim 2, further comprising:
automatically generating by the DMS a query information table for storing nouns classified according to their attributes,
storing by the DMS a search word for each attribute, and
inserting into the query by the DMS, a search word associated with the attribute is selected from the query information table.

4. The schedule information management method of claim 1, wherein the Web search result is in the form of a Web page.

5. The schedule information management method of claim 4, wherein tags are removed from the received Web page by the DMS to extract text and image data and the detailed schedule information containing the extracted text and image data is generated in a form displayable by the portable terminal.

6. The schedule information management method of claim 1, further comprising:
outputting, by the portable terminal after reception of the detailed schedule information, the detailed schedule information.

7. The schedule information management method of claim 6, wherein the outputting step comprises:
checking a planned event time associated with the detailed schedule information; and outputting the detailed schedule information at the commencement of a preset time before the planned event time.

8. A schedule information management system comprising:
a schedule information management apparatus connected to a digital living network alliance (DLNA) network, for schedule information management; and
a portable terminal for composing a schedule memo according to a request and outputting detailed schedule information generated using the schedule memo to a user;
wherein the generated detailed schedule information comprises supplementary information related to the schedule memo and which has been automatically obtained from a Web search result based on nouns extracted from words in the schedule memo that are classified according to their attributes; and
wherein the supplementary information comprises additional information based on information in the schedule memo that supplements the schedule memo.

9. A schedule information management apparatus comprising:
a digital living network alliance (DLNA) interface for storing DLNA protocols and means for sending and receiving data through a DLNA network;
a schedule memo analyzer means for analyzing a schedule memo received from an external, device transmitted through the DLNA interface to the schedule memo analyzer means;
a query generator means for automatically generating a query to search for supplementary information related to the analyzed schedule memo without a user request;
a Web interface means for transmitting the generated query to a Web server and receiving, in reply to the query, a Web search result from the Web server;
a schedule information generator means for generating detailed schedule information related to the schedule memo from the Web search result; and
a controller means for controlling the DLNA interface to transmit the detailed schedule information to the external device;
wherein the generated detailed schedule information comprises supplementary information related to the schedule memo and which has been obtained from the Web search result based on nouns extracted from words in the schedule memo that are classified according to their attributes; and
wherein the supplementary information comprises additional information that supplements the schedule memo.

10. The schedule information management apparatus of claim 9, wherein the schedule memo analyzer means separates the schedule memo into words and transmits effective nouns selected from the separated words to the query generator means.

11. The schedule information management apparatus of claim 10, wherein the query generator means generates a query comprising at least one pre-stored search site address and at least one of the effective nouns.

12. The schedule information management apparatus of claim 11, further comprising:
a query information memory means for storing nouns that frequently occur in schedule memos, which are classified according to their attributes, and for storing a search word to be inserted into a query for each attribute, and wherein the query generator means finds an attribute of an effective noun, if available, from the query information memory means and inserts a selected search word associated with the found attribute into the generated query.

13. The schedule information management apparatus of claim 9, wherein the Web interface receives a Web page from the Web server as the Web search result.

14. The schedule information management apparatus of claim 13, wherein the schedule information generator means removes tags from the received Web page to extract text and image data, and generates the detailed schedule information containing the extracted text and image data in a form displayable by the external device.

15. A portable terminal comprising:
- an input unit for inputting an input from a user;
- a personal information management module for storing a schedule memo input through the input unit;
- a digital living network alliance (DLNA) interface for storing DLNA protocols and for sending the schedule memo through a DLNA network; and
- a controller for controlling, upon reception of automatically generated detailed schedule information related to the schedule memo through the DLNA interface, output of the detailed schedule information;

wherein the generated detailed schedule information comprises supplementary information related to the schedule memo and which has been obtained from a Web search result based on nouns extracted from words in the schedule memo that are classified according to their attributes;

wherein the supplementary information comprises additional information that supplements the schedule memo.

16. The portable terminal of claim 15, wherein the controller checks a planned event time associated with the detailed schedule information, and controls an output operation to output the detailed schedule information at the commencement of a preset time before the planned event time.

* * * * *